United States Patent
Kring et al.

(10) Patent No.: US 10,521,742 B2
(45) Date of Patent: Dec. 31, 2019

(54) SYSTEM AND A METHOD FOR COLLECTING BATCHES OF FOOD

(71) Applicants: SCANDINAVIAN MICRO BIODEVICES APS, Farum (DK); CHR. HANSEN A/S, Hørsholm (DK)

(72) Inventors: Ole Kring, Birkerød (DK); Bent Overby, Glostrup (DK); Martin Heller, Farum (DK); Niels Kristian Bau-Madsen, Hellerup (DK); Lars Mogensen, Hillerød (DK)

(73) Assignee: SCANDINAVIAN MICRO BIODEVICES APS, Farum (DK)

( * ) Notice: Subject to any disclaimer, the term of this patent is extended or adjusted under 35 U.S.C. 154(b) by 13 days.

(21) Appl. No.: 16/071,669

(22) PCT Filed: Jan. 17, 2017

(86) PCT No.: PCT/DK2017/050009
§ 371 (c)(1),
(2) Date: Jul. 20, 2018

(87) PCT Pub. No.: WO2017/125111
PCT Pub. Date: Jul. 27, 2017

(65) Prior Publication Data
US 2019/0026662 A1 Jan. 24, 2019

(30) Foreign Application Priority Data
Jan. 21, 2016 (DK) .................. 2016 70032

(51) Int. Cl.
*G06F 17/00* (2019.01)
*G06Q 10/06* (2012.01)
(Continued)

(52) U.S. Cl.
CPC ....... *G06Q 10/0631* (2013.01); *G06Q 10/047* (2013.01); *G06Q 10/0832* (2013.01); *G06Q 10/0838* (2013.01); *G06Q 50/28* (2013.01)

(58) Field of Classification Search
USPC .......................................... 235/375, 383, 385
See application file for complete search history.

(56) References Cited

U.S. PATENT DOCUMENTS

| 4,394,567 | A | 6/1983 | Schoenhuber |
| 6,947,903 | B1 * | 9/2005 | Perry .................. G06Q 10/087 705/28 |

(Continued)

FOREIGN PATENT DOCUMENTS

| AU | 2011101433 A4 | 12/2011 |
| EP | 2299417 A1 | 3/2011 |

(Continued)

OTHER PUBLICATIONS

Search Report and Opinion dated Sep. 19, 2016, by the Danish Patent Office in Application No. PA 2016 70032, 7 pages.

(Continued)

*Primary Examiner* — Tuyen K Vo
(74) *Attorney, Agent, or Firm* — Buchanan Ingersoll & Rooney P.C.

(57) ABSTRACT

The invention comprises a system for collecting batches of food from food suppliers. The system comprises at least one movable collecting unit with an associated data receiver; a food parameter determining system for determining at least one batch parameter of a collected food batch; a database system for storing food supplier data comprising at least one food collecting address identification for each food supplier, food receiver data comprising at least one food delivering address identification for each of at least one food receiver station and reference data comprising threshold data for said at least one batch parameter or derived parameter correlated (Continued)

to said batch parameter. The system further comprises a server system coupled to said database system and being in data communication with said data receiver. The server system receives at least data from the database system and batch parameter data and calculates logistic plan(s) for the movable collecting unit(s).

26 Claims, 12 Drawing Sheets

(51) Int. Cl.
    *G06Q 10/08*     (2012.01)
    *G06Q 10/04*     (2012.01)
    *G06Q 50/28*     (2012.01)

(56) References Cited

U.S. PATENT DOCUMENTS

| | | |
|---|---|---|
| 2004/0154548 A1 | 8/2004 | Eriksson |
| 2008/0230606 A1 | 9/2008 | Tompson et al. |
| 2010/0154713 A1 | 6/2010 | Tamminga |
| 2011/0077990 A1* | 3/2011 | Storage ............ G06Q 10/06395 705/7.41 |
| 2011/0258134 A1 | 10/2011 | Mendez |
| 2015/0324742 A1* | 11/2015 | Herjolfsson ....... G06Q 10/0833 235/376 |
| 2016/0117783 A1* | 4/2016 | Singh .................. G06Q 30/018 705/317 |

FOREIGN PATENT DOCUMENTS

| | | |
|---|---|---|
| WO | 9705768 A1 | 2/1997 |
| WO | 2013142218 A1 | 9/2013 |

OTHER PUBLICATIONS

Van der Spiegel et al., "Towards a decision support system for control of multiple food safety hazards in raw milk production." Trends in Food Science & Technology, vol. 34, Issue 2, 2013, pp. 137-145.

Butler et al. "INtegrating information technology and operation research in the management of milk collection." Journal of Food Engineering, vol. 70, Issue 3, 2005, pp. 341-349.

Extended European Search Report dated May 16, 2019, issued by the European Patent Office in corresponding European Application No. 17741128.7-1222, (8 pages).

\* cited by examiner

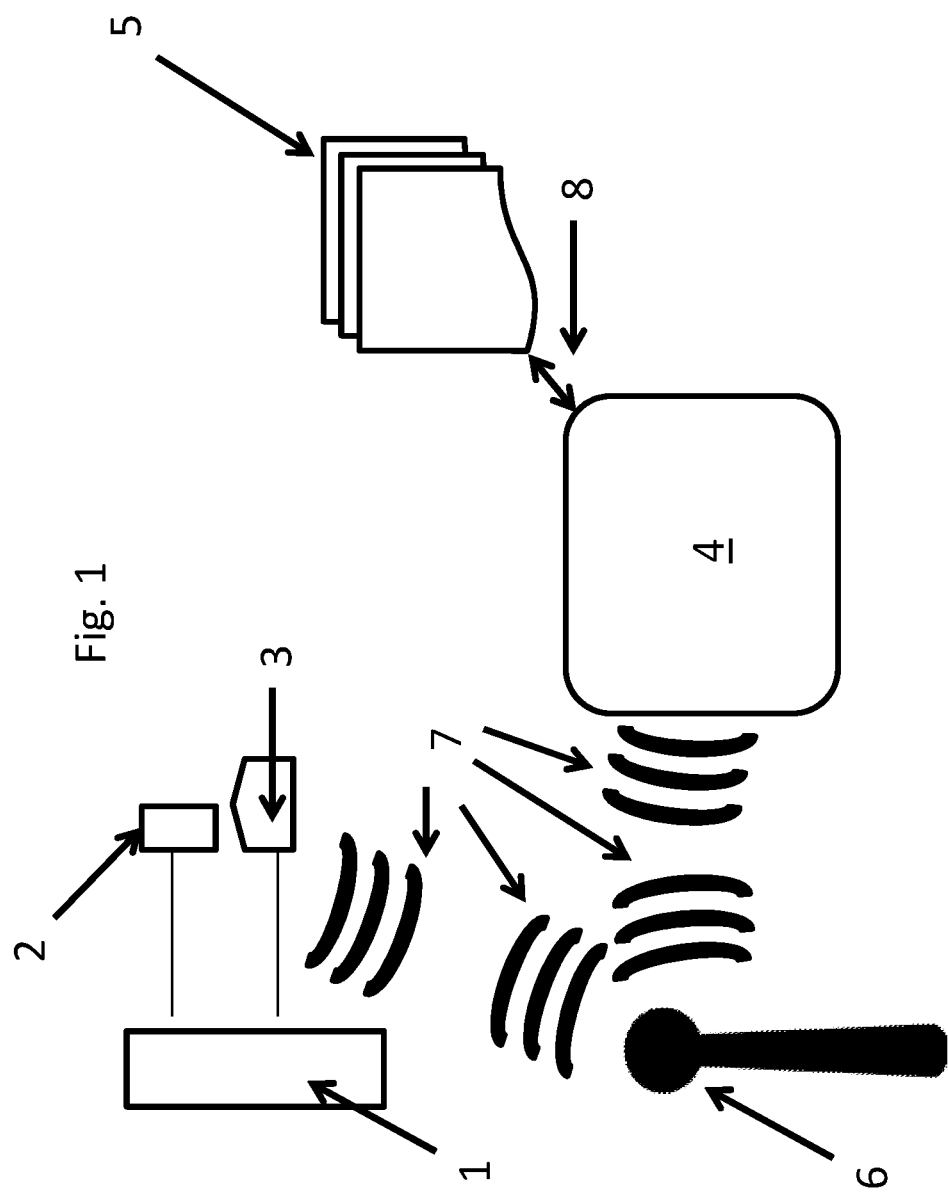

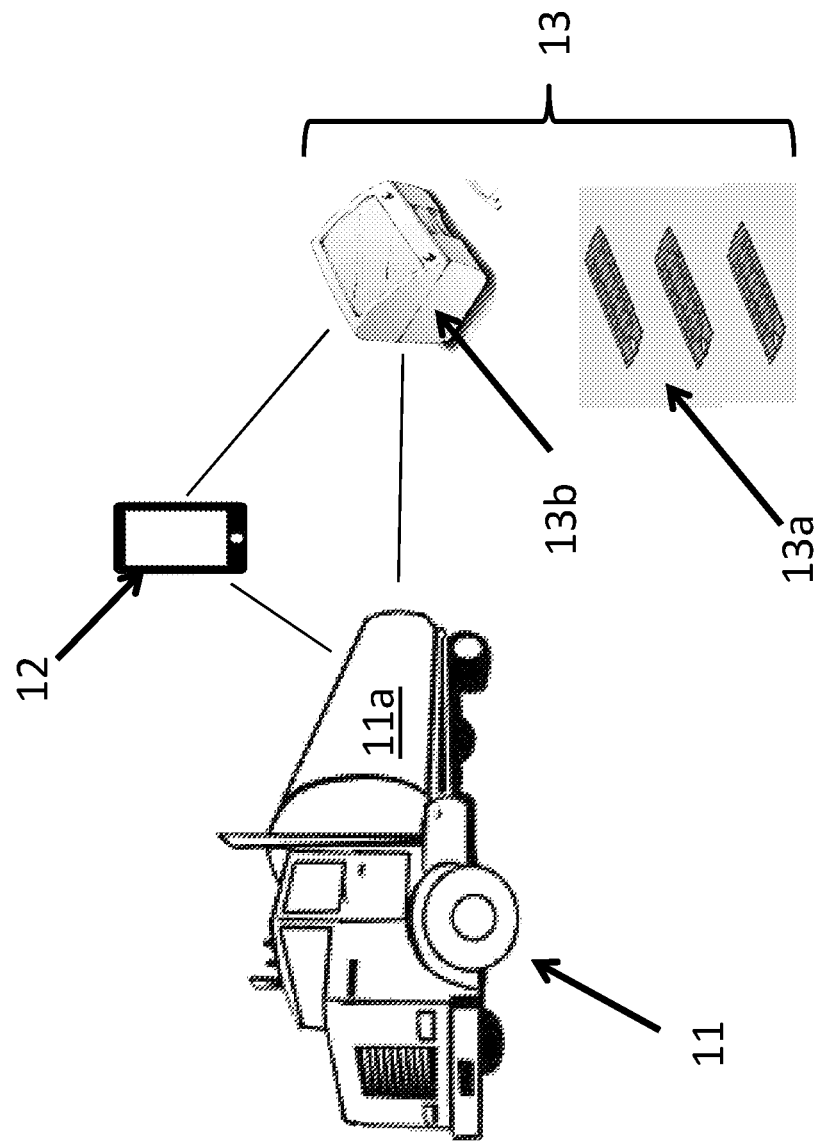

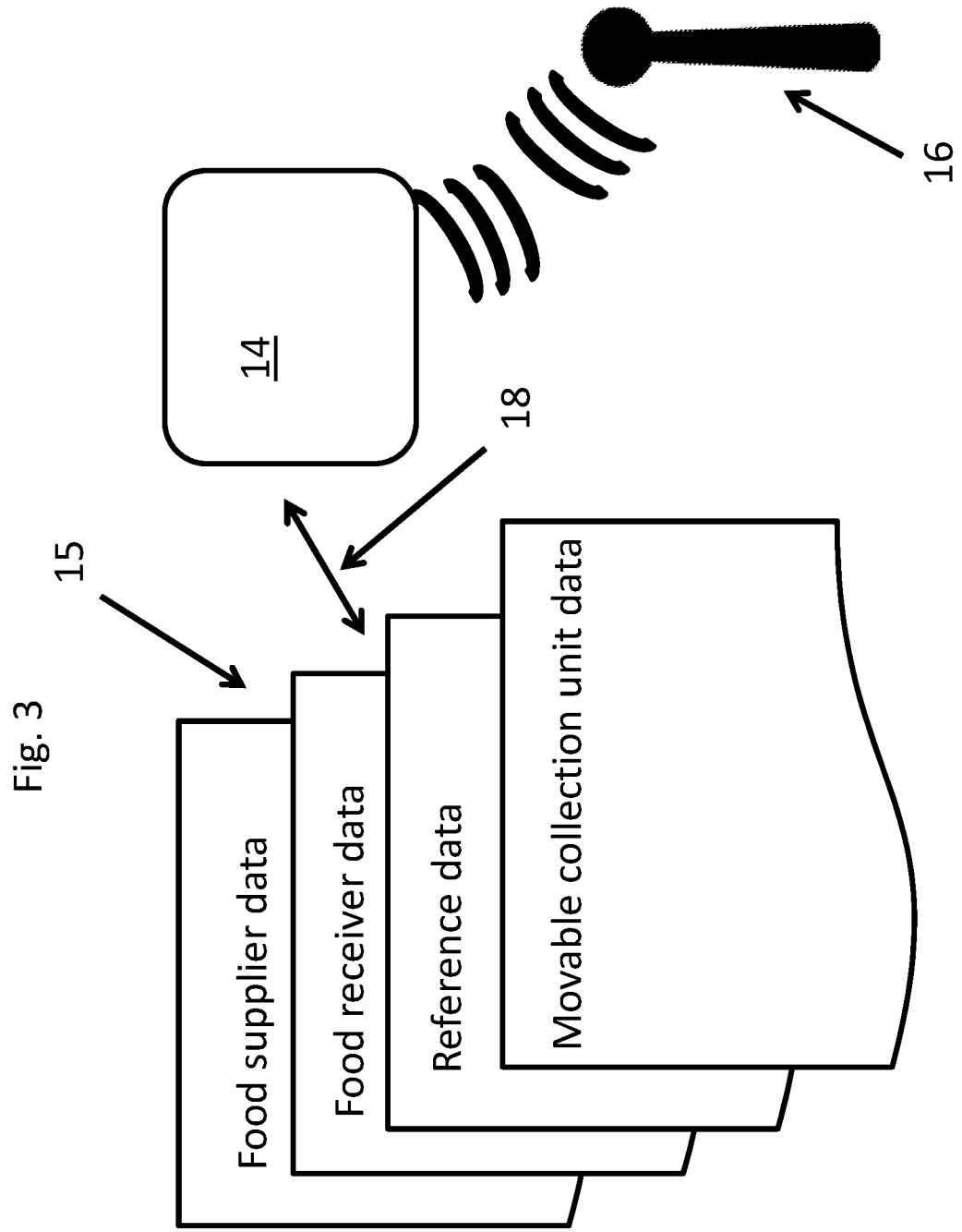

Fig. 4a

Food supplier data – Basic data

| Supplier code | Address id District | Address id Street, town etc. | Contact person 1 | Contact person 2 | Payment data |
|---|---|---|---|---|---|
| ZYX | ... | | | | |
| AAA | ... | | | | |
| ZXY | ... | | | | |
| BBB | ... | | | | |
| ... | ... | ... | ... | | |
| ... | ... | | | ... | |
| ZYX | ... | | | | |
| ... | | | | | |

Fig. 4b

Food supplier data - Batches

| Supplier code | Food batch code | Estimated quantity | Estimated quality | Estimated Time of arrival | Open/ closed |
|---|---|---|---|---|---|
| ZYX | Milk-321 | ... | | | |
| AAA | Milk-795 | | | | |
| ZXY | Milk-111 | | | | |
| BBB | ... | | | | |
| ... | ... | | | | |
| ... | ... | | | | |
| ZYX | Eggs-759 | | | | |
| ... | Meat-K78 | | | | |

Fig. 4c

Food supplier data – Batches

| Supplier code | Food batch code | Actual quantity | Actual quality | Transportation time | Price |
|---|---|---|---|---|---|
| ZYX | Milk-321 | ... | ... | ... | ... |
| AAA | Milk-795 | | | | |
| ZXY | Milk-111 | | | | |
| BBB | ... | | | | |
| ... | ... | | | | |
| ... | ... | | | | |
| ZYX | Eggs-759 | | | | |
| ... | Meat-K78 | | | | |

Fig. 5a

Food receiver data – Basic data

| Receiver code | Address id District | Address id Street, town etc. | Contact person 1 | Contact person 2 | Payment data |
|---|---|---|---|---|---|
| ZYX | ... | | | | ... |
| AAA | ... | | | | |
| ZXY | ... | | | | |
| BBB | ... | | | | |
| ... | ... | | | | |
| ... | ... | | | | |
| ZYX | ... | | | | |
| ... | | | | | |

Fig. 5b

Food receiver data – Requested food

| Receiver code | Requested food code | Requested quantity | Requested quality | Time of request | Time of delivery |
|---|---|---|---|---|---|
| ZYX | Milk-321 | ... | ... | ... | ... |
| AAA | Milk-795 | | | | |
| ZXY | Milk-111 | | | | |
| BBB | ... | | | | |
| ... | ... | | | | |
| ... | ... | | | | |
| ZYX | Eggs-759 | | | | |
| ... | Meat-K78 | | | | |

Fig. 5c

Food receiver data – Requested food

| Receiver code | Requested food code | Delivered quantity | Delivered quality | Supplier profile | Cost |
|---|---|---|---|---|---|
| ZYX | Milk-321 | ..... | ..... | ..... | ..... |
| AAA | Milk-795 | | | | |
| ZXY | Milk-111 | | | | |
| BBB | ... | ... | ... | | |
| ... | ... | | | | |
| ZYX | Eggs-759 | | | | |
| ... | Meat-K78 | | | | |

Fig. 6

Reference data

| Food code | Batch parameter | Treshold 1 | Treshold 2 | Treshold 3 |
|---|---|---|---|---|
| Milk | ... | ... | | |
| Milk | ... | ... | | |
| Milk | ... | ... | | |
| Meat | ... | ... | | |
| ... | ... | ... | | |
| ... | ... | ... | | |
| | | ... | | |

Fig. 7

Movable collection unit data

| Unit code | Unit type | Capacity | Operation plan | Active/inactive |
|---|---|---|---|---|
| zyz | ... | ... | ... | ... |
| | ... | ... | | |
| | ... | ... | | |
| | ... | ... | | |
| | ... | ... | | |
| | ... | ... | | |
| | ... | ... | | |
| | ... | ... | | |

Fig. 8

Logistic plan

| Unit code | Address id Next stop | Estimated time of arrival Next stop | Estimate time for loading/unloading Next stop | Address id Next stop +1 | Estimated time of arrival Next stop+1 | Estimated time for loading/unloading Next stop |
|---|---|---|---|---|---|---|
| zyz | ... | ... | ... | ... | ... | |
| | | ... | | | | |
| | | ... | | | | |
| | | ... | | | | |
| | | ... | | | | |
| | | ... | | | | |
| | ... | ... | | | | |
| | ... | ... | | | | |

SYSTEM AND A METHOD FOR COLLECTING BATCHES OF FOOD

TECHNICAL FIELD

The invention relates to a system and a method for collecting batches of food.

BACKGROUND ART

Many food products or raw food products are produced by relatively small food suppliers, such as farmers from where they are usually collected to a food distributor for further processing and/or packing prior to being distributed to consumer markets or directly to consumers.

Generally it is important to keep high control with the collection and handling of food due to food safety and the respective governments generally have very restrictive rules to ensure an acceptable food quality.

Today a general collection system comprises that quantities of food are poured into delivery containers and placed on supply points available to be collected there by collective transport vehicles from where they are collected by a truck or similar vehicle. An assessment of the quality of the food is usually performed by withdrawing samples at the collection point for performing an initial assessment, and additional samples are withdrawn at the receiving food facility.

AU 2011101433 describes a logistic system for the collection, transport and delivery of milk from a plurality of geographically dispersed milk storage facilities to at least one customer. The milk is stored at the storage facilities in one or more vats having an array of sensors determining parameters relevant for the milk quality. The data is transmitted automatically to a server and a computer in communication with the server calculates a pickup and delivery route for one or more transport vehicles. It is mentioned that the transport vehicles may comprise sensors that monitor critical parameters of the transported milk (e.g. volume and temperature) and the sensed data may be transmitted to the computer and the pickup and delivery route may be improved.

U.S. Pat. No. 4,394,567 A describes a system for recording data which relate to lots to be collected, particularly to milk lots to be delivered to a central collecting station. A recorder is installed on the collecting vehicle comprising the normally existing data memory and, closely adjacent thereto, a second memory, which has preferably the same structure and serves to store those data which are required in an analytical laboratory for an analysis of samples taken from the lots as they were collected. These data are recorded in the second memory under the control of a selector. By means of the second memory, a separate data carrier is provided, which is delivered to the analytical laboratory, in which data representing the result of the various analyses are recorded on the data carrier so as to supplement the data originally recorded thereon. In this way the data can be fully automatically collected and processed, uniform technology can be used in the system required for this purpose and, as a result, the equipment used on the collecting vehicle and in the analytical laboratory can be simplified and the overall functional reliability can be improved.

DISCLOSURE OF INVENTION

An object of the invention is to provide an improved system for collecting batches of food from food suppliers where the food batches can be collected much faster and with increased control of the collection procedure and of the quality of the collected food.

An object of the invention is to provide an improved method of controlling collecting of batches of food from food suppliers where the food batches can be collected much faster and with increased control of the collection procedure and of the quality of the collected food.

An object of the invention is to provide a system and a method for collecting batches of food from food suppliers where the risk of food spoilage is reduced.

These and other objects have been solved by the invention as defined in the claims and as described herein below.

The system for collecting batches of food from food suppliers of the invention the system comprises
- at least one movable collecting unit comprising a collecting container for collecting batches of food and an associated data receiver;
- a food parameter determining system for determining at least one batch parameter of a collected food batch
- a database system for storing food supplier data comprising at least one food collecting address identification for each food supplier, food receiver data comprising at least one food delivering address identification for each of at least one food receiver station and reference data comprising threshold data for the at least one batch parameter or derived parameter correlated to the batch parameter
- a server system coupled to the database system and being in data communication with the data receiver.

The food parameter determining system is configured for determining the at least one batch parameter of respective food batches consecutively as they are collected by the movable collecting unit and for transmitting the determined batch parameter of the respective collected batches of food to the server system.

The server system is programmed
- to acquire supplier data from the database system;
- to consecutively receive the determined batch parameter of the respective batches of food collected by the respective movable collecting unit to the server system;
- to compare the consecutively received batch parameter and/or a derived parameter to the parameter reference data and, if the batch parameter and/or a derived parameter exceeds a threshold data of the reference data,
- to calculate a logistic plan for each movable collecting unit and
  - for each movable collecting unit determine if the server system comprises a valid logistic plan and if so determine if the calculated logistic plan differs from the valid logistic plan and if so
  - deem the valid logistic plan to be a previous logistic plan,
  - store the calculated logistic plan to the associated data receiver as a valid logistic plan
  - and transmit the calculated logistic plan to the associated data receiver.

The determination of whether the server system comprises a valid logistic plan may be performed by attempting to determine if the calculated logistic plan differs from the valid logistic plan. If the determination is not possible the server system does not comprise a valid logistic plan and a first logistic plan may advantageously be requested or generated by the server system and stored as a valid logistic plan.

The term "a food batch" is herein used to define a batch of food supplied and collected from one food supplier. A food supplier may supply several food batches of the same or different types of food, e.g. a batch of milk and a batch of cow meat.

The term "substantially" should herein be taken to mean that ordinary product variances and tolerances are comprised.

The term "about" is generally used to include what is within measurement uncertainties. When used in ranges the term "about" should herein be taken to mean that what is within measurement uncertainties is included in the range.

Throughout the description or claims, the singular encompasses the plural unless otherwise specified or required by the context. For example where the terms 'batch parameter' and/or 'derived parameter' are used in the singular the plural meaning of the terms is also included unless otherwise specified or required by the context.

The system of the invention for collecting batches of food from food suppliers has been found to be very effective for collecting food batches very fast and with high control of the quality of the collected food batches. Due to the fact that the system for collecting batches of food from food suppliers repeatedly calculates and optimizes the valid logistic plan for each movable collecting unit in dependence of the batch parameters, a high control of the collection procedure and of the quality of the collected food is ensured. Further, a poor food quality of a food batch may be discovered at a very early stage after collecting a batch, and the food batch with a poor quality may be discharged before contaminating food from other collected food batches, or the valid logistic plan may be replaced by a new valid logistic plan to ensure that the food batch with a poor quality or the missed collected food if the batches are mixed upon collection are transported to a food receiver station where the poor quality is acceptable or are transported to a food receiver station faster than it would be otherwise—e.g. to ensure that a microbial parameter is kept below a certain threshold—or are transported to a food receiver station where a corresponding food quality is estimated to be higher such that a resulting quality upon mixing food batches will be within an acceptable level.

In the following, embodiments of the invention will be described in particular with reference to milk/milk batches as the food/food batches, however it should be understood that milk/milk batches is merely an example of food/food batches and that the described embodiments also include corresponding systems where the food/food batches are other than milk/milk batches.

Advantageously the first mentioned valid logistic plan is a previously calculated logistic plan or a user-provided logistic plan, e.g. fed to the server system via a user interface. A user-provided logistic plan may for example be a first logistic plan or it may be an overwriting logistic plan fed by a user to replace a valid logistic plan e.g. if the user (preferably an operator of the system) wishes to change an order of collecting or delivering food.

In an embodiment the first mentioned valid logistic plan is first logistic plan.

In an embodiment when the system is started it requires a first logistic plan for each movable collecting unit to be stored as a valid logistic plan for said respective movable collecting unit.

In an embodiment the server system is configured for receiving the first logistic plan via a user interface. The first logistic plan may e.g. be transmitted to the server system via the internet. The server system is configured such that upon receipt of the first logistic plan the server system stores the first logistic plan as a valid logistic plan.

In an embodiment the server system is programmed to acquire supplier data from the database system and to determine the first logistic plan e.g. by calculating a logistic plan or merely by selecting the supplier nearest to a movable collecting unit to be the first logistic plan for this movable collecting unit.

The first logistic plan comprises at least a first collecting address identification for each movable collecting unit.

In an embodiment the server system is configured for determining the first logistic plan comprising at least a first collecting address for each of the at least one movable collecting unit(s) without the use of any batch parameters. Thereby the first logistic plan including the first collection address can be transmitted to the associated data receiver of respective movable collection unit(s) prior to initiating the collection of food batches. In an alternative embodiment the respective movable collection unit(s) receive information about the respective first collection address from another source—e.g. by random selection or by selecting the nearest.

In an embodiment the server system is programmed to
for each movable collecting unit determine if the server system comprises a valid logistic plan,
  if yes determine if the calculated logistic plan differs from the valid logistic plan and if so
    deem the valid logistic plan to be a previous logistic plan,
    store said calculated logistic plan as a valid logistic plan and
    transmit said calculated logistic plan to said associated data receiver,
  if no,
    store said calculated logistic plan as a valid logistic plan and
    transmit said calculated logistic plan to said associated data receiver.

Thereby additional movable collecting units can be introduced into the system or classified as active during operation of the system.

In an embodiment the food batches comprise food batches of solid food and/or batches of liquid food such as batches of meat, corn, vegetables, dairy and/or juice.

In an embodiment the food batches are liquid food batches, such as batches of milk or juice. Such liquid food batches may be mixed in a collecting container (also called a bulk container) as the respective food batches are collected, or they may be kept in separate containers.

In practice it is much more efficient to transport the collected liquid food in a batch container since much more liquid food may then be transported by a given movable collecting unit. Also the handling of the smaller container may be more expensive than the handling of bulk containers, due to the larger number of smaller containers required.

On the other hand a single batch of poor quality may damage the already collected liquid food in a bulk container.

In an embodiment the reference data comprising threshold data for discharging a food batch and the at least one batch parameter of a collected food batch is determined prior to filling the collected food batch into the bulk container. The collected food batch may for example be contained in a temporary holding tank until the data receiver associated with the movable collecting unit which has collected the food batch has received a signal from the server system to remove the collected food batch from the temporary holding tank to the bulk container or to change its valid logistic plan and drive the collected food batch to a discharge station.

Advantageously the server system is programmed to calculate the logistic plan for the at least one movable collecting unit based on the supplier data for the food batches to be collected and the consecutively received batch parameter and/or derived parameter.

As the food batches are collected, the valid logistic plan is advantageously confirmed or replaced by a new valid logistic plan depending on a plurality of parameters including the consecutively received batch parameter and/or derived parameter.

A derived parameter from a batch parameter can in principle be any derived parameter which contains information about a quality or a status of the food batch or a mixture of food batches comprising the food batch in question.

The derived batch parameter may for example be a calculation of microbial data and/or contamination data and/or quantity data at a present or future point of time based on known data and optionally expected data and/or estimated data, where the known data comprises at least the batch parameter in question.

In an embodiment the server system is programmed to calculate the logistic plan for the at least one movable collecting unit based on the supplier data for the food batches to be collected and the consecutively received batch parameter and/or derived parameter and one or more previously received batch parameter(s) and/or derived parameter(s) or combinations thereof.

In an embodiment the server system is programmed to calculate the logistic plan for the at least one movable collecting unit to optimize the quality and quantity of the collected and delivered food. The reference data may for example be selected to comprise high threshold(s) i.e. require the batch parameter and/or derived parameter to ensure the selected high quality e.g. such that a food batches with lower quality are discharged or are delivered to a food receiver station where the requirements to quality are less demanding.

In an embodiment the calculated logistic plan comprises at least a first collecting address identification and/or a food delivering address identification for the at least one movable collection unit, optionally the calculated logistic plan comprises a logistic order of collecting address identifications. Advantageously the calculated logistic plan comprises at least a logistic plan for the next 2. 3 or more collecting address identifications (suppliers) and/or food delivering address identifications (receivers) which the movable collecting unit is to drive to. In an embodiment the calculated logistic plan comprises a full logistic plan for the rest of the working day for the driver. In an embodiment the calculated logistic plan comprises a full logistic plan for the rest of the active period for the movable collecting unit. The active period is used to mean a time slot in which the movable collecting unit is active and/or classified as active.

Even though the valid logistic plan may be replaced by a new valid logistic plan it may be helpful for the driver to know a full logistic plan for a given time slot e.g. the remaining working hours for the driver or the active period for the movable collecting unit. Further the supplier and the receivers may have an estimated time of arrival of the movable collecting unit.

Advantageously a collecting address identification comprises an actual collection address or a code for an actual collection address, wherein the associated data receiver preferably is configured for recognizing the actual collection address from the code. Thereby the data receiver can decode the received valid logistic plan.

In the same way a food delivering address identification advantageously comprises an actual food delivering address or a code for an actual food delivering address, wherein the associated data receiver preferably is configured for recognizing the actual food delivering address from the code.

Where the collecting address identification(s) and/or the food delivering address identification(s) is/are in the form of codes in the transmitted logistic plan, the valid logistic plan is difficult to decode by other (people or machines) who does not comprise decoding data. Thereby the logistic plan may be transmitted to be visible on the internet without other (people or machines) than the intended users, who have the decoding data, will be able to decode the collecting address identification(s) and/or the food delivering address identification(s). In this embodiment also additional data parts of the logistic plan may be in coded form.

In an embodiment the food supplier data comprises previously supplied food data for at least one previously supplied food batch. The previously supplied food data may for example comprise at least one of date of supply, quantity and/or quality of the food batch(es), payment of the food batch(es), name of person(s) loading and/or unloading the food batch(es) from the movable collecting unit, identification of the movable collecting unit collecting the food batch(es), name of the driver(s) of the movable collecting unit during the transportation of the food batch(es) and/or other data related to the food batch(es).

Advantageously the previously supplied food data comprises at least the quality of the food batch(es), wherein the quality comprises at least one of temperature at the time of collection, food composition e.g. fat content, presence of contaminants and microbial data.

In an embodiment the food supplier data comprises the expected supplier food data for at least one food batch to be collected. The expected supplier food data preferably comprises at least one of expected quantity and expected quality, wherein the expected quality comprises at least one of expected temperature at collection, expected food composition, expected contaminations and expected microbial data. Further expected supplier food data advantageously includes estimated payment of the food batch(es).

In an embodiment the server system is programmed to include the expected quantity and/or expected quality for food batches to be collected in the calculation of the logistic plan for the at least one movable collecting unit. This data may for example be supplied by the food supplier and/or be generated from previous delivered food batches by the same food supplier.

By using such expected supplier food data the system can calculate logistic plans which are valid for longer time than without the use of such expected supplier food data, because the valid logistic plan then only needs to be replaced where the expected supplier food data deviates from corresponding actual data or where other unexpected incidents occur.

In an embodiment the suppliers may themselves load supplier food data to the system, e.g. expected supplier food data.

In an embodiment the food receiver data comprises food delivering address identification for each of one or more food receiver stations, wherein the one or more food receiver stations is a food processing station, a packing station, a market and/or a disposal station.

In an embodiment the food receiver data comprises a food receiver request for each of one or more food receiver stations. The food receiver request preferably comprises at least one of requested quantity and requested quality of one or more foods.

In an embodiment the receivers may themselves load food receiver data to the system, e.g. food receiver requests.

When the system knows the food receiver requests the collection of food batches may be optimized to fulfill the food receiver requests i.e. the collected quality and/or quality of food collected by a movable collecting unit can be adapted to the food receiver requests for the delivering station which is to receive their food from this movable collecting unit.

The batch parameter may in principle be any parameter for a batch that provides any parameter that provides a qualitative and/or a quantitative information about the batch. Examples of batch parameters are temperature, pH value, volume, weight, concentration, color, food composition, contaminants, microbial data, etc.

The food composition may be e.g. fat content, protein content and/or dry matter content.

In an embodiment the at least one batch parameter is selected from a quantity batch parameter and/or a quality batch parameter and preferably the determining system is configured for determining two or more batch parameters, such as at least one quantity batch parameter and at least one quality batch parameter, such as at least volume, temperature and presence of contaminants. The system for collecting batches of food from food suppliers preferably comprises at least one food parameter determining system for each movable collecting unit and where each food parameter determining system is associated with a specific movable collecting unit.

Preferably the at least one batch parameter comprises at least one quality batch parameter, preferably selected from temperature at collection, presence of contaminants food composition and microbial data.

The food parameter determining system may be any determining system capable of determining a batch parameter, e.g. the food parameter determining system is configured for determinating at least one of temperature at collection, food composition, presence of contaminants and microbial data.

In an embodiment the food parameter determining system is configured for determining at least one batch parameter.

The food parameter determining system is advantageously a relatively fast operating food parameter determining system. Advantageously the food parameter determining system is configured for performing a batch parameter determination within 30 minutes such as within 20 minutes, such as within 10 minutes. Preferred food parameter determining systems include a thermometer, a pH meter, a voltage meter, a microfluidic based food parameter determining system, a lateral flow based food parameter determining system, an optically based food parameter determining system, e.g. using fluorescence or any combinations thereof. Such systems are generally known in the art and will not be described further herein.

The food parameter determining system may be a movable food parameter determining system or it may be fixed to the movable collecting unit. In an embodiment the food parameter determining system is positioned on the movable collecting unit.

The food parameter determining system is preferably configured for automatically transmitting the determined batch parameter to the server system. Thereby any risk for human error in the interpreting and/or handling of batch parameters is avoided.

In an embodiment the food parameter determining system is configured for receiving a sample of a batch during collection and determine the at least one batch parameter.

The sample may be automatically fed to the food parameter determining system or it may be manually fed to the food parameter determining system, e.g. by the driver of the movable collecting unit or another operator.

In an embodiment the food parameter determining system is configured for acquiring a sample of a batch during collection and determining the at least one batch parameter. The automatic sample acquisition is preferred due to reduced risk of error.

In an embodiment the food parameter determining system is configured for determining the at least one batch parameter directly on the food batch during collection. This is preferred for quantitative batch parameters and some qualitative batch parameters, such as temperature and pH value.

The movable collecting unit may be any kind of movable unit capable of transporting at least one food batch.

In an embodiment the at least one movable collection unit is a vehicle, a ship or an airplane, preferably the at least one movable unit is a vehicle, such as a food motor transporter comprising at least one container such as a cooling container and/or a tank.

In an embodiment the system comprises a plurality of movable collecting units. The plurality of movable collection units may be equal or different in size and/or type. A system may for example comprise one or more larger food motor transporter and one or more smaller food motor transporter. By having movable collecting units with different transportation capacity the system may organize the collection of food batches such that their respective capacities are utilized best way possible e.g. while simultaneously ensuring high quality and control of collected food batches e.g. in view of requests from receivers.

Advantageously each of the at least one movable collecting units comprises a positioning system, such as a global positioning system (GPS), configured for acquiring position data of the respective movable collection unit. The position data preferably comprises at least a present position of the respective movable collection unit. The positioning system may advantageously be in data communication with the server system, such that the server system can receive and/or acquire position data for the movable collecting unit(s). The server system will thereby be informed if a route takes longer or shorter than expected and such information may advantageously be used in the calculation of logistic plans. In an embodiment the server system is configured to recalculate the logistic plan for one or more movable collecting unit(s) if an estimated time for a route deviates to a selected degree from an actual time for a route. Such recalculated plans may replace valid logistic plans and simultaneously an alarm may be triggered to warn an operator that a movable collecting unit is not following a time schedule e.g. due to traffic jam and/or due to an accident.

In an embodiment the system is configured for transmitting position data of the at least one movable collection unit to the server system, the server system is preferably configured for acquiring the position data of the at least one movable collection unit from the positioning system and/or the food parameter determining system is configured for acquiring the position data of the at least one movable collection unit to the server system and transmitting the positioning data to the server system together with the determined batch para meter.

In an embodiment the server system is programmed to include the positioning data of the movable unit(s) in the calculation of the logistic plan for the at least one movable collecting unit.

The associated data receiver may be fixed to the movable collection unit e.g. in form of a combined receiver and positioning system or the associated data receiver may be a portable unit, such as a handheld device, such as a cell phone and/or a tablet. In an embodiment the operation of the associated data receiver is incorporated into an app on said cell phone and/or said tablet.

The associated data receiver is advantageously configured for receiving a valid logistic plan from the server system, storing the received valid logistic plan and deeming previously received and stored valid logistic plan(s) to be previous logistic plan(s).

In an embodiment the associated data receiver is configured to display at least a next collecting address or delivering address of the valid logistic plan visually and/or audibly to a driver of the movable collection unit. Where the valid logistic plan comprises several consecutive collecting addresses and optionally a delivering address, the associated data receiver is preferably configured for displaying the collecting addresses and optional delivering address visually and/or audibly to a driver of the movable collection unit. More preferably the associated data receiver is configured for displaying the collecting addresses and optional delivering address all together and/or in a logistic order. The associated data receiver preferably has several views, such that the driver can select a view or switch between views. In an embodiment at least one view is a plot on a map and preferably the associated data receiver is connected to or integrated with a navigator comprising the positioning system.

In an embodiment the server is programmed to calculate a derived batch parameter from the at least one batch parameter, wherein the derived batch parameter preferably is a calculation of microbial data and/or contamination data and/or quantity data at a present or future point of time based on known, expected and/or estimated data, such as temperature data, quantity data, pH data and/or combinations thereof, optionally the derived batch parameter is a derived batch parameter for the batch or for a mixture of batches comprising the batch, such as a mixture comprising collected batches.

In a preferred embodiment the food batches are liquid food batches, such as batches of milk or juice.

Where the food batches are liquid it may be preferred to collect the food batches in a common bulk container as described above.

In an embodiment two or more food batches are mixed by being collected in a bulk container to form a batch mixture upon collection. Advantageously the food parameter determining system further is configured for determining at least one batch mixture parameter after each addition of an additional batch to the batch mixture. The batch mixture parameter advantageously is transmitted to the server system and is included in the calculation of logistic plans.

In an embodiment the server system is configured for receiving additional data correlated to one or more batches, one or more food suppliers and/or one or more food receiver stations, one or more reference data via a user interface e.g. fed by the supplier and/or receiver as described above.

The server system is advantageously configured for receiving food supplier data, food receiver data and/or reference data and for storing the received food supplier data, food receiver data and/or reference data onto the database system. Such data may be fed to the server system by a user e.g. on a continuous basis. When loading data relating to food batches to be collected and/or relating to receiver requests such data may advantageously be linked to a time of loading the receiver request and the time of loading data may be used to ensure that earlier fed data are given higher priority than later fed data.

In an embodiment the database system is configured for storing movable collecting unit data for movable collecting units of the system. The movable collecting unit data preferably comprises the type of movable collecting unit, load capacity of the movable collecting unit, operation plan and/or status of the movable collecting unit. The operation plan preferably comprises a plan of when the movable collecting unit is to be active and/or inactive.

In an embodiment the server system is configured for acquiring movable collecting unit data from the database system and classifying the movable collecting units of the system as active or inactive where the classification preferably is performed based on user instructions. Where the movable collecting units are classified as active or inactive, logistic plans are calculated only for active movable collecting units.

The classification of the movable collecting unit as active or inactive may be performed by a user e.g. via the internet, via SMS and/or via e-mail. The server system receives the user instruction and preferably controls if the user is permitted to give such instructions and if so the server system performs the classification according to the instruction received from the user.

Preferably the movable collecting unit is classified as active or inactive by user(s), such as by the driver(s) of one or more of the respective movable collecting unit(s).

In use of the system a number of movable collecting units are provided and preferably classified as active. A number of food parameter determining systems are provided, preferably at least one for each movable collecting unit.

The database system is loaded with food supplier data comprising at least one food collecting address identification for each food supplier, food receiver data comprising at least one food delivering address identification for each of at least one food receiver station and reference data comprising threshold data for said at least one batch parameter or derived parameter correlated to said batch parameter.

A first logistic plan for each movable collecting unit is loaded to or generated (calculated or selected—e.g. randomly or a nearest to movable collecting unit address identification) by the server system.

Upon collecting a food batch the food parameter determining system determines at least one batch parameter and transmits the batch parameter to the server system.

The server system
acquires supplier data from the database system;
receives said determined batch parameter;
compares said received batch parameter and/or a derived parameter to the parameter reference data and if the batch parameter and/or a derived parameter exceeds a threshold data of the reference data
calculates a logistic plan for each of the at least one movable collecting unit and
for each movable collecting unit determines if said calculated logistic plan differs from the valid logistic plan and if so
deems the valid logistic plan to be a previous logistic plan,
stores the calculated logistic plan as a valid logistic plan and
transmits the calculated logistic plan to the associated data receiver.

The invention also comprises a method for controlling batches of food from food suppliers. The method comprises providing a system according to any one of the preceding claims, loading data to the database system comprising food supplier data comprising at least one food collecting address identification for each food supplier, food receiver data comprising at least one delivering address identification for each of at least one food receiver station and reference data comprising threshold data for the at least one batch parameter or derived parameter correlated to the batch parameter; and providing driver(s) of the movable collecting unit to follow the logistic plan provided via the associated data receiver.

Preferably the data to the database system is fed to the database system via the server system. It has been found to be very advantageous that the data is fed to the server system by at least one user interface in data communication with the server system e.g. via the internet. Thereby several users such as suppliers, receivers and/or operators can load data to the system. The different users may be accepted on different levels, e.g. such that suppliers only can load supplier data, receivers only can load receiver data and operators can load any data.

Advantageously the supplier data and/or receiver data to the database system is fed to the database system by suppliers and/or receivers.

In an embodiment the server system is configured for classifying the movable collecting units of the system as active or inactive. The method comprises transmitting a signal to said server system for classifying the at least one movable collecting unit as an active movable collecting unit. The signal preferably further comprises time data for the time during which the movable collecting unit is to remain being classified as an active movable collecting unit.

In an embodiment the method comprises delivering the collected food batches to receiver stations. Preferably the method comprises collecting batches of liquid food, such as milk and/or juice.

In an embodiment the method comprises instructing the server system to determine a supplier profile for food delivered to the respective receiver stations. The supplier profile preferably comprises a list of food suppliers with each food supplier associated with an amount of delivered food originating from a collected batch of the respective food supplier.

In an embodiment the method comprises instructing the server system to calculate a price for delivered food for each receiver station depending on the supplier profile for food delivered to the respective receiver stations and the batch parameter(s) of each of the respective batches from where the delivered food originates. Thereby the receiver can be ensured if the delivered quality/quantity corresponds to the requested and he can be ensured to have a fair price.

In an embodiment the method comprises instructing the server system to calculate a price for collected batches for each supplier in dependence on the amount and the batch parameter of each of the respective collected batches from each supplier. Thereby the supplier can be ensured to receive a correct payment for his food batches reflecting both the quantity and the quality of the food batches. Further, the supplier can very quickly see which payment he will receive for the supplied food batches.

All features of the invention and embodiments of the invention as described above including ranges and preferred ranges may be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

FIG. 1 is a schematic illustration of a system for collecting batches of food from food suppliers according to an embodiment of the invention.

FIG. 2 is a schematic illustration of a movable collecting unit and its associated data receiver together with a food parameter determining system according to an embodiment of the invention.

FIG. 3 is a schematic illustration of a database system in data communication with a server system and the internet according to an embodiment of the invention.

FIGS. 4a, 4b, 4c, 5a, 5b, 5c, 6, 7 and 8 are illustrations of examples of data configurations of a database system according to an embodiment of the invention.

The figures are schematic and simplified for clarity. Throughout, the same reference numerals are used for identical or corresponding parts.

Further scope of applicability of the present invention will become apparent from the description given hereinafter. However, it should be understood that the description and specific examples, while indicating preferred embodiments of the invention, are given by way of illustration only, since various changes and modifications within the spirit and scope of the invention will become apparent to those skilled in the art from this description and examples.

The system for collecting batches of food from food suppliers shown in FIG. 1 comprises a movable collecting unit 1 with an associated data receiver 2 and a food parameter determining system 3. The movable collecting unit 1 comprises a not shown collecting container for collecting batches of food. The food parameter determining system is adapted for determining at least one batch parameter of a collected food batch.

The system for collecting batches of food from food suppliers further comprises a server system 4 and a database system 5.

The database system 5 is configured for storing food supplier data comprising at least one food collecting address identification for each food supplier, food receiver data comprising at least one food delivering address identification for each of at least one food receiver station and reference data comprising threshold data for said at least one batch parameter or derived parameter correlated to said batch parameter.

The database system 5 and the server system 4 are in data communication as indicated by the arrow 8, such that data can be loaded onto the database system 5 via the server system 4 and such that the server system 4 can acquire data from the database system 5.

The server system 4 can communicate with other digital units via the internet e.g. via a base transceiver station (BTS) 6, as illustrated by the wave shapes 7.

The associated data receiver 2 is associated with the movable collecting unit 1 as a unique pair e.g. as described above. The associated data receiver 2 may for example be a cellphone or a tablet and the association between the movable collecting unit 1 and the associated data receiver 2 may e.g. be provided by an app into which the driver can enter a unique movable collecting unit code for the movable collecting unit 1.

The food parameter determining system is configured for determining the at least one batch parameter of respective food batches consecutively as they are collected by the movable collecting unit and to transmit the determined batch parameter of the respective collected batches of food to the server system. The food parameter determining system may be manually handled by an operator e.g. the driver. However, preferably the food parameter determining system is preferably partly or fully automatic. For example in an embodiment the operator applies a drop of collected milk onto the food parameter determining system and the rest of the determination and the transmission of batch parameter data occur automatically.

The server system 4 is programmed to
acquire supplier data from the database system 5;
consecutively receive the determined batch parameter of the respective collected batches of food;
compare the consecutively received batch parameter and/or a derived parameter to the parameter reference data and if the batch parameter and/or a derived parameter exceeds a threshold data of the reference data
calculate a logistic plan for each of the movable collecting unit 1 and
determine if the calculated logistic plan differs from a stored valid logistic plan and if so
deem the valid logistic plan to be a previous logistic plan,
store the calculated logistic plan as a valid logistic plan and
transmit the calculated logistic plan to the associated data receiver 2.

The movable collecting unit 11 and its associated data receiver 12 together with a food parameter determining system 13 as shown in FIG. 2, is advantageously part of a system as shown in FIG. 1. The movable collecting unit 11 is here a truck for transporting milk or other liquid food. The movable collecting unit 11 has a tank 11a and is associated with the associated data receiver 12—which here is a cell phone, and the food parameter determining system 13. The food parameter determining system 13 is in the form of a plurality of micro fluidic devices 13a and an optical reader 13b for reading the microfluidic devices 13a. In use a drop of milk is applied to a microfluidic device 13a and the slide is inserted into the reader 13b for reading the batch parameter of the batch of milk. The reader 13b is advantageously in data communication with the server system 4 for transmitting the batch parameter and/or a derived parameter to the server system 4. After the batch parameter has been read the used microfluidic device 13a may be discharged.

The database system 15 illustrated in FIG. 3 is in data communication with the server system 14 as indicated with the arrow 18, such that data can be loaded onto the database system 15 via the server system 14 and such that the server system 14 can acquire data from the database system 15.

The database system 15 comprises a number of different data which are further illustrated in the tables shown in 4a, 4b, 4c, 5a, 5b, 5c, 6, 7 and 8.

The server system 14 can communicate with other digital units via the internet e.g. via a base transceiver station (BTS) 16, as illustrated by the wave shapes 17.

FIGS. 4a, 4b, 4c, 5a, 5b, 5c, 6, 7 and 8 are illustrations of examples of data configurations of a database system according to an embodiment of the invention. The data of the database system could be stored in any other configuration and the shown configuration and content of data are merely disclosed by way of example.

The lists of FIGS. 4a, 4b, 4c comprises food supplier data. The basic food supplier data shown in FIG. 4a is advantageously entered by an official operator—i.e. not the supplier. By entering the basic supplier data and ensuring that the basic supplier data is complete the official operator approves the supplier. The supplier receives a unique user code so that the supplier may himself enter batch data such as listed in FIG. 4b—except for the "Actual time of arrival" data which is entered by the driver upon collecting of the food batch(es). The data of FIG. 4c is generated by the server system 4, 14 and supplied to the database system 5, 15 for being stored. The supplier data of FIG. 4c or an extract thereof, may advantageously be transmitted to the respective suppliers as a receipt and the calculated price for the respective food batches are advantageously transferred to the accounts of the respective suppliers.

The lists of FIGS. 5a, 5b, 5c comprise food receiver data. The basic food receiver data shown in FIG. 5a is advantageously entered by an official operator—i.e. not the receiver. By entering the basic receiver data and ensuring that the basic receiver data is complete the official operator approves the receiver. The receiver receives a unique user code so that the receiver may himself enter requests for food, such as listed in FIG. 5b—except for the "Time of request" data which is generated by the server system 4, 14, and the "Time of delivery" data which is entered by the driver upon delivering the food. The data of FIG. 5c is generated by the server system 4, 14 and supplied to the database system 5, 15 for being stored. The receiver data of FIG. 5c or an extract thereof may advantageously be transmitted to the respective receivers as a receipt together with an invoice for the price for the food.

The reference data of FIG. 6 may comprise one or more batch parameters each associated with at least one threshold. I FIG. 6 it is indicated that there are 3 thresholds for each batch parameter, however it should be understood that there may be fewer or further thresholds for each batch parameter and the number of thresholds need not be equal for all batch parameters.

For milk a batch parameter may e.g. content of a specific or a type of bacteria or another contamination and the threshold may e.g. be as follows:
Threshold 1: "if content>X->discharge milk"
Threshold 2: "if content<x and >0.5*X->drive directly to nearest receiver"
Threshold 3: "if content <0.5* and >0.3*X->if content in the totality of collected milk in the tank has an average content <0.3 then calculate logistic plan such that the total of the milk in the tank and the milk batches to be collected based on estimated content will result in a total content <0.3"
Threshold 4: "if content >0.3*X->if content in the totality of collected milk in the tank has an average content >0.3*x then drive to supplier requesting quality E-milk", etc.

The data of FIG. 7 comprises movable collecting unit data. From this list the server system 4, 14 can retrieve information about which type of food a given movable collecting unit can transport, capacity, operation plan and whether or not the respective movable collecting unit is active. Other data, such as fuel status, driver, and similar could also be included in the movable collecting unit data.

The data of FIG. 9 shows an example of logistic plans for the respective movable collecting units of a system.

The invention claimed is:
1. A system for collecting batches of food from food suppliers the system comprising:

at least one movable collecting unit comprising a collecting container for collecting batches of food and an associated data receiver for instructing a driver of the movable collecting unit;

a food parameter determining system for determining at least one batch parameter of a collected food batch;

a database system for storing food supplier data comprising at least one food collecting address identification for each food supplier, food receiver data comprising at least one food delivering address identification for each of at least one food receiver station and reference data comprising threshold data for said at least one batch parameter or derived parameter correlated to said batch parameter;

a server system coupled to said database system and being in data communication with said data receiver, wherein said food parameter determining system is configured for determining said at least one batch parameter of respective food batches consecutively as they are collected by the movable collecting unit(s) and to transmit said determined batch parameter of said respective collected batches of food to said server system, said server system is programmed to:
acquire supplier data from said database system;
consecutively receive said determined batch parameter of said respective collected batches of food;
compare said consecutively received batch parameter or a derived parameter to said parameter reference data and if said batch parameter or a derived parameter exceeds a threshold data of said reference data;
calculate a logistic plan for each of the at least one movable collecting unit and
for each movable collecting unit determine if said server system comprises a valid logistic plan and if so determine if said calculated logistic plan differs from said valid logistic plan and if so
  i. deem said valid logistic plan to be a previous logistic plan,
  ii. store said calculated logistic plan as a valid logistic plan, and
  iii. transmit said calculated logistic plan to said associated data receiver.

2. The system for collecting batches of food according to claim 1, wherein said server system is programmed to acquire supplier data from said database system and to determine said first logistic plan comprising at least a first collecting address identification for each of said at least one movable collecting unit(s).

3. The system for collecting batches of food according to claim 1, wherein
said server system is programmed to:
for each movable collecting unit determine if said server system comprises a valid logistic plan,
if no,
  i. store said calculated logistic plan as a valid logistic plan and
  ii. transmit said calculated logistic plan to said associated data receiver.

4. The system for collecting batches of food according to claim 1, wherein said server system is programmed to calculate said logistic plan for the at least one movable collecting unit based on the supplier data for the food batches to be collected and said consecutively received batch parameter or derived parameter and one or more previously received batch parameter or derived parameter or combinations thereof.

5. The system for collecting batches of food according to claim 1, wherein the said calculated logistic plan comprises at least a first collecting address identification or a food delivering address identification for said at least one movable collection unit.

6. The system for collecting batches of food according to claim 1, wherein said food supplier data comprises expected supplier food data for at least one food batch to be collected, said expected supplier food data comprises at least one of expected quantity or expected quality.

7. The system for collecting batches of food according to claim 6, wherein said server system is programmed to include said at least one of expected quantity or expected quality for food batches to be collected in the calculation of said logistic plan for the at least one movable collecting unit.

8. The system for collecting batches of food according to claim 1, wherein said food receiver data comprises food delivering address identification for each of one or more food receiver stations, wherein said each of one or more food receiver stations is a food processing station, a packing station, a market, or a disposal station.

9. The system for collecting batches of food according to claim 1, wherein said food receiver data comprises a food receiver request for each of one or more food receiver stations, said food receiver request comprises at least one of requested quantity and requested quality of one or more foods.

10. The system for collecting batches of food according to claim 1, wherein said food parameter determining system is configured for determining at least one batch parameter.

11. The system for collecting batches of food according to claim 1, wherein said at least one movable collection unit is a vehicle, a ship or an airplane.

12. The system for collecting batches of food according to claim 1, wherein said system comprises a plurality of movable collecting units.

13. The system for collecting batches of food according to claim 1, wherein each of said at least one movable collecting unit comprises a positioning system.

14. The system for collecting batches of food according to claim 13, wherein said system is configured for transmitting position data of said at least one movable collection unit to said server system.

15. The system for collecting batches of food according to claim 14, wherein said server system is programmed to include said positioning data of said at least one movable unit in the calculation of said logistic plan for the at least one movable collecting unit.

16. The system for collecting batches of food according to claim 1, wherein said associated data receiver is configured for receiving a valid logistic plan from said server system, storing said received valid logistic plan and deeming previously received and stored valid logistic plan(s) to be previous logistic plan(s).

17. The system for collecting batches of food according to claim 16, wherein said associated data receiver is configured to display at least a next collecting address or delivering address of said valid logistic plan visually, audibly, or visually and audibly to a driver of said movable collection unit, and where said valid logistic plan comprises several collecting addresses in a logistic order.

18. The system for collecting batches of food according to claim 1, wherein said server is programmed to calculate a derived batch parameter from said at least one batch parameter.

19. The system for collecting batches of food according to claim 1 wherein said food batches comprise food batches of solid food or batches of liquid food.

20. The system for collecting batches of food according to claim 1 wherein said food batches are liquid food batches and where two or more food batches are mixed to form a batch mixture upon collection, said food parameter determining system further is configured for determining at least one batch mixture parameter after each addition of an additional batch to said batch mixture.

21. The system for collecting batches of food according to claim 1 wherein said database system is configured for storing movable collecting unit data for movable collecting units of the system, said movable collecting unit data comprises the type of movable collecting unit, load capacity of said movable collecting unit, operation plan, or status of said movable collecting unit.

22. The system for collecting batches of food according to claim 21, wherein said server system is configured for acquiring supplier data from said database system and classifying said movable collecting units of the system as active or inactive.

23. A method of controlling batches of food from food suppliers, the method comprising
   providing a system according to claim 1,
   loading data to the database system comprising food supplier data comprising at least one food collecting address identification for each food supplier, food receiver data comprising at least one delivering address identification for each of at least one food receiver station and reference data comprising threshold data for said at least one batch parameter or derived parameter correlated to said batch parameter; and
   instructing driver(s) of the movable collecting unit to follow the logistic plan provided via the associated data receiver.

24. The method of controlling the collecting of batches of food according claim 23, wherein the server system is configured for classifying said movable collecting units of the system as active or inactive, said method comprising checking in said at least one movable collecting unit by transmitting a signal to said server system for classifying said at least one movable collecting unit as an active movable collecting unit.

25. The method of controlling the collecting of batches of food according to claim 23, wherein the method comprises instructing the server system to calculate a price for delivered food for each receiver stations depending on the supplier profile for food delivered to said respective receiver stations and the batch parameter(s) of each of the respective batches from where the delivered food originates.

26. The method of controlling the collecting of batches of food according to claim 23, wherein the method comprises instructing the server system to calculate a payment for collected batches for each supplier depending on the amount and the batch parameter of each of the respective collected batches from each supplier.

* * * * *